2,847,468
Patented Aug. 12, 1958

2,847,468

SEPARATION OF FORMIC ACID FROM EPOXIDES

James H. Gardner, Weston, and Charles I. Tewksbury, Chestnut Hill, Mass., assignors, by mesne assignments, to Escambia Chemical Corporation, Pace, Fla., a corporation of Delaware No Drawing. Application May 9, 1956
Serial No. 583,630

4 Claims. (Cl. 260—542)

The invention relates to the production of chemicals and in particular to the separation of formic acid from other organic compounds.

A principal object of the present invention is to provide a process for the selective separation of formic acid from easily hydrolyzable organic compounds.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description.

Many processes produce mixtures of products which include therein formic acid and an easily hydrolyzable organic compound, e. g., epoxides. Since formic acid exerts a strong hydrolyzing action, it is often desirable to separate the formic acid from easily hydrolyzable compounds so that these valuable compounds may be recovered and utilized as such. It has been found now that the formic acid included in such mixtures may be selectively separated therefrom without, at the same time, removing or affecting any of the easily hydrolyzable organic compounds or other organic products such as acetic acid.

The present invention preferably comprises contacting an organic mixture containing formic acid and an easily hydrolyzable organic compound with an amount of solid calcium carbonate which is at least theoretically necessary to selectively react with all the formic acid present.

The following non-limiting example illustrates one method of practicing the present invention.

*Example 1*

A benzene solution comprising 500 cc. of benzene, 16 grams of acetic acid, 11.5 grams of formic acid, and 29 grams of propylene oxide was refluxed with 25 grams of solid calcium carbonate at a temperature of about 80° C. for about 20 minutes. Upon termination of the refluxing, 97 percent of the formic acid was neutralized and recovered as calcium formate. Substantially all of the original acetic acid and propylene oxide were also recovered as such by distillation of the benzene solution.

While a specific example of the present invention has been given above, it is subject to wide variations without departing from the scope thereof. For example, the selective neutralization of formic acid by means of solid calcium carbonate, is applicable regardless of the amount or quantity of formic acid present in the mixture to be treated. The amount of solid calcium carbonate employed, however, must be sufficient to be capable of reacting with and neutralizing all of the formic acid present. Thus the amount of solid calcium carbonate employed must be at least equal to that stoichiometrically or theoretically required to react with the formic acid present. The calcium formate formed by the selective neutralization of formic acid may be easily removed from the treated organic mixture by simple physical separation techniques. The calcium formate may be used as such, for example, in the preparation of oxalic acid, or it may be converted back to formic acid by well-known techniques.

In addition to the above described batch type of reaction, it is also possible to carry out the process of the present invention on a continuous basis. For example, the formic acid-bearing mixture to be treated may be passed or contacted, in a continuous stream, over solid calcium carbonate.

The removal of formic acid from organic mixtures is preferably achieved in a water-immiscible organic solvent such as benzene. Other suitable water-immiscible organic solvents are toluene, xylene and the like.

The reaction between formic acid and calcium carbonate takes place at relatively low temperatures and in particular at temperatures below the boiling point of formic acid. Thus, at atmospheric pressure, the temperature is preferably maintained below about 100° C.

Since certain changes may be made in the above process without departing from the scope of the invention herein involved, it is intended that all matter contained in the above description shall be interpreted as illustrative and not in a limiting sense.

What is claimed is:

1. Process of separating formic acid from a mixture containing formic acid and an epoxide which comprises contacting said mixture with calcium carbonate at an elevated temperature, said calcium carbonate being employed in an amount which is at least that theoretically required to neutralize the formic acid present in said mixture, and separating the resulting calcium formate.

2. Process of claim 1 wherein said epoxide is propylene oxide.

3. Process of separating formic acid from a mixture containing formic acid and an epoxide which comprises contacting said mixture, while dissolved in benzene, with calcium carbonate at an elevated temperature and separating the resulting calcium formate from the mixture.

4. Process for separating formic acid from a mixture containing formic acid, acetic acid and propylene oxide which comprises contacting said mixture, while dissolved in benzene, with calcium carbonate at an elevated temperature and separating the resulting calcium formate from the mixture.

References Cited in the file of this patent

UNITED STATES PATENTS 1,993,259    Buc ------------------ Mar. 5, 1935

OTHER REFERENCES

Groggins: Unit Processes in Organic Synthesis, 1952, pp. 438–9.